United States Patent
Farley et al.

(10) Patent No.: US 10,999,231 B1
(45) Date of Patent: May 4, 2021

(54) USER DEFINED APPLICATION CODE FOR ELECTRONIC MAIL

(71) Applicant: Amazon Technologies, Inc., Seattle, WA (US)

(72) Inventors: Benjamin Tillman Farley, The Hague (NL); Leandro Batista Lameiro, Leiden (NL); Christine Marie Gerpheide, The Hague (NL)

(73) Assignee: Amazon Technologies, Inc., Seattle, WA (US)

( * ) Notice: Subject to any disclaimer, the term of this patent is extended or adjusted under 35 U.S.C. 154(b) by 1 day.

(21) Appl. No.: 16/369,668

(22) Filed: Mar. 29, 2019

(51) Int. Cl.
*G06F 15/16* (2006.01)
*H04L 12/58* (2006.01)

(52) U.S. Cl.
CPC .............. *H04L 51/18* (2013.01); *H04L 51/08* (2013.01); *H04L 51/22* (2013.01)

(58) Field of Classification Search
USPC ........................................................ 709/206
See application file for complete search history.

(56) References Cited

U.S. PATENT DOCUMENTS

| | | | | |
|---|---|---|---|---|
| 2011/0040863 | A1* | 2/2011 | Griffin | H04L 67/1095 709/223 |
| 2011/0307565 | A1* | 12/2011 | Szady | H04L 51/38 709/206 |
| 2012/0240062 | A1* | 9/2012 | Passmore | H04L 51/32 715/758 |
| 2013/0144951 | A1* | 6/2013 | Viswanath | H04L 67/2823 709/204 |
| 2013/0339077 | A1* | 12/2013 | Maresh | G06Q 10/06 705/7.19 |
| 2014/0164759 | A1* | 6/2014 | Dabbiere | H04L 63/0435 713/152 |
| 2015/0113079 | A1* | 4/2015 | Etgar | H04L 51/22 709/206 |
| 2015/0195233 | A1* | 7/2015 | Ramanathan | H04L 51/18 709/207 |
| 2017/0331777 | A1* | 11/2017 | Brisebois | H04L 51/16 |
| 2019/0394145 | A1* | 12/2019 | Le Huerou | H04W 4/14 |

\* cited by examiner

*Primary Examiner* — Anthony Mejia
(74) *Attorney, Agent, or Firm* — BakerHostetler

(57) ABSTRACT

Method and systems are disclosed for providing a function as a service for an application. The application may comprise an email application. A user may define or select an application codes set for performing a specific functionality. The user may define rules that associate specific events with execution of the application code set. Upon detection of an event, a condition may be checked associated with the application. If the condition is satisfied, the application code set may be caused to be executed. The application code set may modify data, such as an email message.

21 Claims, 7 Drawing Sheets

```
CreateRule(
  EventType = MailReceived,
  Condition = SenderMatches:*@gmail.com
  Action = Lambda(
    ARN = arn:aws:lambda:us-east-1:123456789012:function:DropAttachments,
    RetryPeriod = 1 hour,
    DefaultBehavior = BOUNCE
  )
)
```

FIG. 3

```
1  import email, boto3
2
3  def email_handler(event, context):
4      workmail = boto3.client('workmail',region_name=AWS_REGION)
5      msg_id = event['message_id']
6      summary = event['message_summary']
7      if summary.has_attachments:
8          raw_msg = workmail.get_message(msg_id)
9
10         parser = email.parser.Parser()
11         parsed_msg = parser.parse(raw_msg)
12         new_msg = remove_attachments(parsed_msg)
13
14         workmail.put_message(msg_id, new_msg)
15     return {
16         'response' : 'CONTINUE'
17     }
```

FIG. 4

USER DEFINED APPLICATION CODE FOR ELECTRONIC MAIL

BACKGROUND

IT administrators are tasked with a wide range of email-related responsibilities, from managing infrastructure to enforcing security policies to providing the right tools for their organizations to be as productive as possible. To build comprehensive solutions IT administrators typically must work with a combination of basic email features, 3rd party hardware and software, and custom scripting and servers. For some, this involves building complex data pipelines and storage infrastructure in order to track more sophisticated metrics around email usage, while others may buy expensive appliances or software which help them improve the security of the system. These solutions tend to require ongoing maintenance and significant development time, while still not always providing the flexibility the customer needs. Thus, there is a need for more sophisticated and flexible approaches to adding functionality to email.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

FIG. 3 is an example rule for processing an event associated with an email message.

FIG. 4 is an example application code set in accordance with the present disclosure.

DETAILED DESCRIPTION

The present disclosure relates to a service that allows users (e.g., administrators) to create customized email workflows which provide them a cost-effective, low-maintenance, low-friction way of solving business needs related to email. The users may define a discrete piece of logic (e.g., an application script, a function, and the like) that can be managed by a rules engine. The rules engine allows users to define events in an electronic mail message lifecycle that trigger the logic. Electronic mail messages and other system events may be monitored to determine when a specified event occurs. If the specified event occurs, a condition may be evaluated. If the condition is satisfied, then the rules engine may cause the logic to be executed (e.g., by an external services platform). The present disclosure provides improvements over a conventional email service, which only allows simple macros implemented by an application. Users of a conventional service are not able to access more powerful computing languages or create complex and portable rules for evaluating emails at different events in the lifespan of an email.

Figure 1:
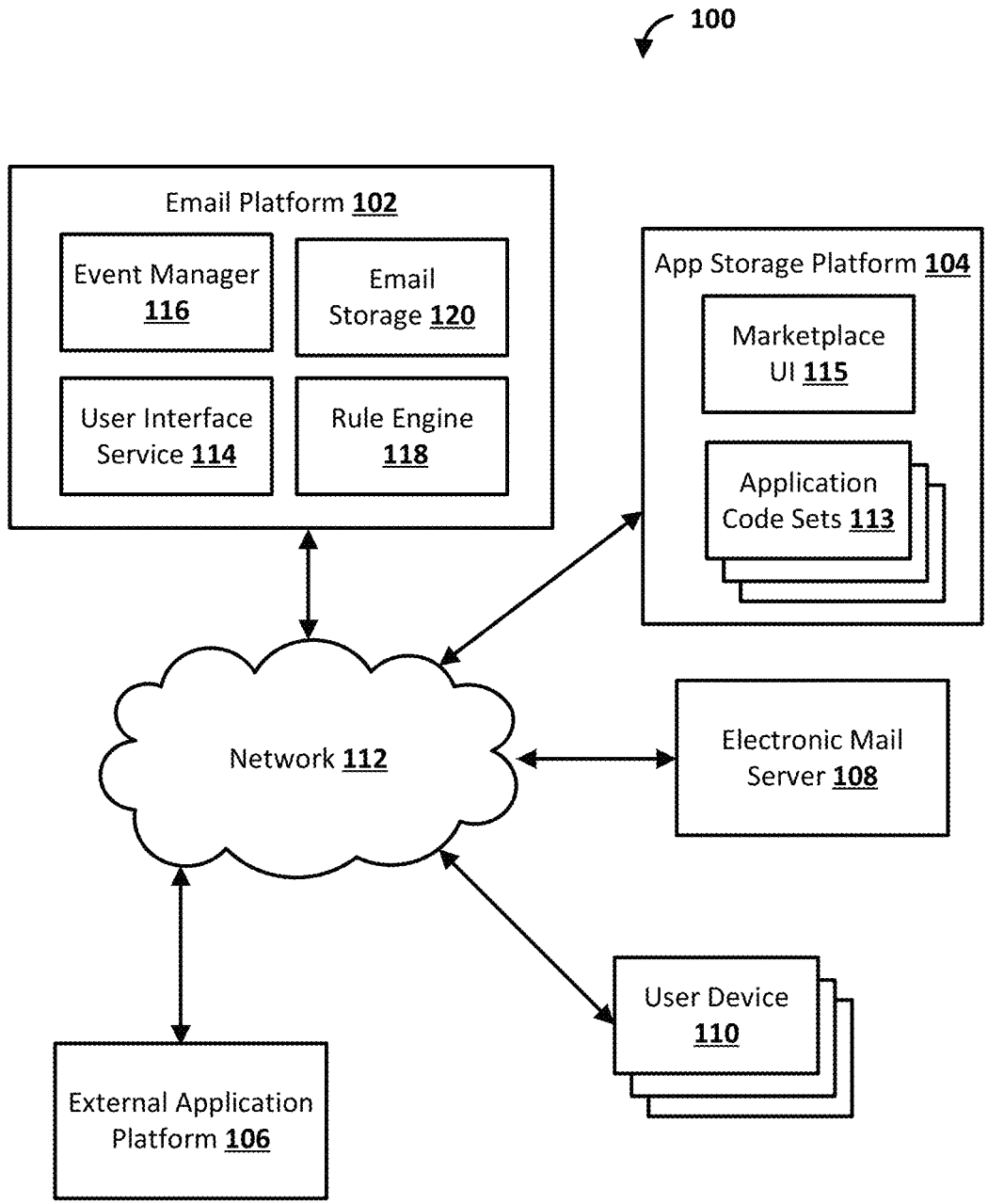
FIG. 1 is a diagram illustrating an example computing system for managing an electronic mail service.

FIG. 1 is a diagram illustrating an example computing system 100 for providing functionality to an application, such as an electronic mail (email) service. The system 100 may comprise an email platform 102 (e.g., or other application platform). The email platform 102 may be configured to provide an email service to a plurality of users. The email service may comprise a web (e.g., or web browser) based email service. The email service may be configured to provide users with email functionality, such as accessing an email account, viewing email messages, organizing folders in the email account, defining rules for processing emails, drafting email messages, and/or the like. The email service may also integrate with other external services, such as services provided by an app storage platform 104, an external application platform 106, and/or the like. The email service may be configured to communicate with an electronic mail server 108 configured to transmit email messages. The email service may be accessed by users via one or more user devices 110.

The system 100 may comprise a network 112. The network 112 may be configured to communicatively couple one or more of email platform 102, the app storage platform 104, the external application platform 106, the electronic mail server 108, the one or more user devices 110, and/or the like. The network 112 may comprise a plurality of network devices, such as routers, switches, access points, switches, hubs, repeaters, modems, gateways, and/or the like. The network 112 may comprise wireless links, wired links, a combination thereof, and/or the like.

The electronic mail server 108 may be configured to route electronic mail messages. The electronic mail server 108 may receive electronic mail messages from the one or more user devices 110, the email platform 102, and/or the like. The electronic mail server 108 may send electronic mail messages to corresponding destination mail addresses. In some implementations, the email platform 102 may be associated with a different electronic mail server than an electronic mail server associated with the one or more user devices 110. The electronic mail server 108 may determine another electronic mail server associated with the destination mail address and send a received electronic mail message to the determined electronic mail server to a user device 110 associated with the mail address. The email platform 102 may comprise an electronic mail server (not shown). The electronic mail server of the email platform 102 may send and/or receive electronic mail messages addressed to and/or sent from the email platform 102.

The one or more user devices 110 may comprise a computing device, such as mobile device, smart devices (e.g., smart watch, smart glasses, smart phone), a computing station, a laptop, a tablet device, and/or the like. The one or more user devices 110 may be configured to output one or more user interfaces, such as a user interface associated with communication platform, an electronic mail user interface, a user interface associated with the external application platform 106, a user interface associated with the app storage platform 104, and/or the like.

The app storage platform 104 (e.g., or services platform) may be configured to allow a plurality of users to input a plurality of application code sets 113 to the services platform for one or more of storing or sharing the application code sets 113. Users of the email platform 102 may access the app storage platform 104 (e.g., via an interface of the email platform 102, or an interface of the app storage platform 104). The users may upload, draft, or otherwise provide application code sets 113. Users may be able to view, select, purchase as a service, and/or otherwise obtain access to application code sets 113 provided by other users. The app storage platform 104 may comprise a marketplace interface 115. The marketplace interface 115 may comprise a user interface, application programming interface, and/or the like configured to allow users to store, view, select, share, sell, purchase, rent, and/or the like the plurality of application code sets 113. The marketplace interface 115 may comprise a web interface, accessible via a web browser application. Third parties, such as software companies, may store, sell, and/or offer application code sets 113 via the marketplace interface 115. The users may set permissions indicating whether the application code sets 113 may be modified by users.

An application code set (e.g., or application, application code, computer code, application script, server-side script, code block, executable, scripting block) may comprise computer-readable instructions. An application code set may comprise functions, parameters, and/or the like formatted according to a programming language. An application code set may comprise an executable application, a script that may be executed by a server (e.g., or other application), and/or the like. Example programming languages include python, php, perl, java, javascript, asp, ruby on rails, C++, and/or the like. The application code set may rely on a server for execution. The application code set may be formatted according to a server-side scripting language.

The app storage platform 104 may provide a serverless code service, a code storage service, a code execution service, a script execution service, and/or the like. The app storage platform 104 may comprise a services platform (e.g., a web-based multi-tenant platform) that allows for execution of an application code set without the user managing (e.g., or being required to manage) a server configured to interpret and/or execute the application code set. The app storage platform 104 may provide an application server (e.g., hypertext transfer protocol server, or other network server) to execute an application code set provided by a user. The user may not have terminal and/or shell access to the application server. The user may only be able to access the app storage platform 104 through an application programming interface (API) and/or a user interface provided by the app storage platform 104. The application server may be configured as a backend service that is inaccessible directly by the user. The app storage platform 104 may be different than a web hosting platform, such as a shared hosting platform and/or other hosting service that allows users to access a root directory associated with an account. Users of the app storage platform 104 may not be able to access directories, such as root directories associated with running the application server.

The email platform 102 may be configured to cause execution of application code sets 113 stored on the app storage platform 104. The email platform 102 may comprise a user interface service 114. The user interface service 114 may provide one or more user interfaces to users associated with the email service. A user interface may allow users (e.g., subscribers) to access email messages. Users may select an application code set (e.g., by browsing available application code sets 113). Users may provide an identifier and/or uniform resource identifier for locating the application code set.

The user interface may also allow the users (e.g., admins, subscribers) to associate one or more rules with execution of an application code set (e.g., selected or otherwise identified). A rule may associate an event with execution of the application code set. An event may comprise receiving an email message, sending an electronic mail message, delivery of the email message (e.g., to an inbox, or external mail server), accessing (e.g., viewing) an email, moving an email, at or before deletion of an email, saving a draft of an email, marking an email (e.g., as read, unread, spam, flagged), logging into an email account, downloading mail to an application, accessing the email account from a particular device and/or device type (e.g., mobile device, table, laptop, workstation), a time period reaching a threshold (e.g., time since email unread or read, time drafting an email, time since email received), receiving a command from a user associated with an email, listing of email messages (e.g., for implementing a custom ranking scheme), when a mailbox reaches a quota (e.g., number of messages, storage size, when a user has not logged in to an account for a number of days, a combination thereof, and/or the like.

A rule may associate a condition to evaluate if the event occurs. If the condition is satisfied, the rule may specify an action to be performed, such as execution of an application code set. In some scenarios, a user may define a plurality of actions to perform (e.g., ordered or unordered), such as execution of a plurality of application code sets 113. A condition may comprise a property associated with an email (e.g., includes attachment, more or less than a character threshold, includes value in a bcc and/or cc field), an email field comprising and/or otherwise matching (e.g., as a regular expression) a value (e.g., a string or Boolean value), and/or the like. A condition may comprise a domain of a recipient and/or sender. A condition may comprise a text value (e.g., a symbol, keyword) appearing in a subject line, and/or body of the email. A condition may comprise matching a specified email address.

An event manager 116 may be configured to detect any of the events associated with the rules. The event manager 116 may send a message to a rule engine 118 to evaluate one or more rules based on a detected event. The message may comprise an email identifier that indicates an email associated with the detected event. The message may comprise the email, a summary of the email, and/or other relevant data. The rules engine 118 may receive the message. The rules engine 118 may determine one or more rules to evaluate in response to receiving the message. For example, all rules having an event type of the detected event may be determined for evaluation. The condition of each rule may be evaluated. If the condition is satisfied, then the rules engine 118 may cause the app storage platform 104 to execute any application code sets 113 that are specified as an action to perform. The rules engine 118 may cause a message to be sent to the app storage platform 104. The message may comprise a uniform resource locator associated with an application code sets 113 and/or other identifying information to cause execution of the application code set. The message may comprise input parameters, such as a storage identifier associated with accessing the email in the email storage 120, the message summary, and/or other data. The rules engine 118 may receive a response message from the app storage platform 104. The response message may indicate a failure condition, an action to perform on the email message (e.g., drop, forward, continue processing, etc.), and/or the like.

The app storage platform 104 may execute the application code set requested in the message from the rules engine 118. The app storage platform 104 may execute the application code set requested. The app storage platform 104 may comprise one or more computing devices used to processes requests. The one or more computing devices may comprise a plurality of computing nodes, such as a computing processors, computing cores, virtual machines, and/or the like. Example computing implementations are described further herein, such as in FIG. 7 and FIG. 8.

The app storage platform 104 may execute the application code set using the input parameters (e.g., message summary, storage identifier). In some executions, the application code set may determine to access additional information about the email message associated with the detected event. The app storage platform 104 may be configured to access the email message by sending a request to the email storage 120 of the email platform 102. In some scenarios, the application code set may cause the sending of the request. The application code set may cause sending a message to an API to access the email message. The application code set may send a message that requests modification (e.g., replace data, append, prepend, change a field, add field, add or remove an attachment) of the email message. The email platform 102 may modify the email message as requested.

The application code set may be configured to cause communication with an external application platform 106. The external application platform 106 may provide a service, such as content editing, customer relationship management, spam filtering, backup storage, task management, collaboration services, calendaring, social media service, and/or the like. The application code set may cause information to be requested from the external application platform 106 (e.g., to use to analyze and/or modify the email message). The application code set may cause a message to be sent to the external application platform 106. The message may request that content be generated and/or added to the external application platform 106. For example, the application code set may determine a task or calendar item based on the email message. The message may request that a task and/or calendar item be added to the external application platform 106. The application code set may determine that a customer has been emailed as part of a marketing campaign. The message may request that a contact event be added to the external application platform 106. The application code set may determine that the user intends to publish the email message or a portion thereof to a social media account. The message may request that the email message be published to the social media account. The application code set may determine that a spam filtering system should be used to analyze the email message. The message may request that the email be analyzed by the spam filtering system.

It should be understood that the system 100 may be used to implement a variety of features. Example features may comprise adding disclaimers, using catch-all addresses, using custom recipients (e.g., +alias@, page+username@, fax+username@), mail-storm prevention, mail flow rules blacklist by IP, watermarking attachments, uploading attachments and replacing them with links to a cloud document service, restricting communication within/between groups, analyzing trending topics of incoming messages, sentiment analysis of customer support messages, detecting and block PCI information like credit card numbers, image recognition or OCR on attachments, encryption, enriching messages with CRM data, a combination thereof, and/or the like.

Figure 2:
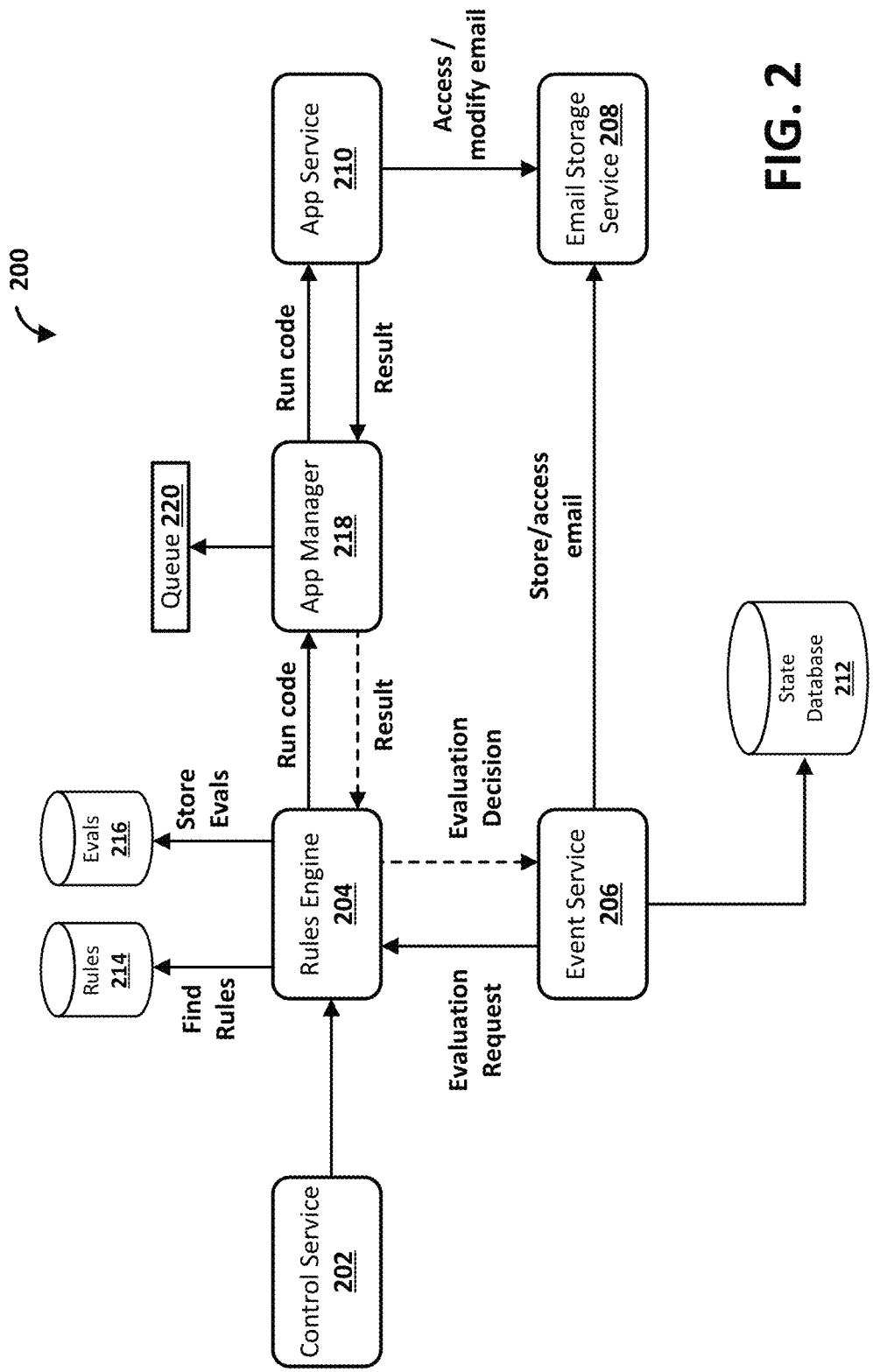
FIG. 2 is a diagram illustrating an example process for adding functionality to an electronic mail service.

FIG. 2 is a diagram illustrating an example process for adding functionality to an electronic mail service by a system 200. Dotted lines in FIG. 2 indicate asynchronous processing as described further below. The system 200 may be implemented in one or more components of the system 100 of FIG. 1. The system 200 may comprise a control service 202. The control service 202 may provide a user interface for an electronic mail service (e.g., a web based email service). The user interface may comprise an administration interface, a user settings interface, and/or the like. The control service 202 may be configured as the entry point for managing rules. Users (e.g., administrators, email subscribers) may enter rules. The control service 202 may be responsible for providing an email administration interface for IT Admins. The control service 202 may access application programming interfaces (e.g. public APIs) for managing resources such as users, groups, and domains. The control service 202 may serve as the entry point for managing rules, but may not evaluate the rules. The control service 202 may be configured as customer-facing API which sends rule-related configuration data to other components in the system 100. The control service may send data (e.g., rules) entered by users to a rules engine 204.

The system 200 may comprise an event service 206. The event service 206 may be configured to detect events associated with an electronic mail service. The event service 206 may be configured to detect events in inbound and outbound pipelines responsible for processing in-transit email. If an email is sent or received, the event service 206 may detect the event. The event service may call rules engine 204 to evaluate any rules related to the message. The event service 206 may cause email messages to be stored in an email storage service 2018. Customers may use (e.g., via an application or user interface) the email storage service 208 to access stored electronic mail messages.

To allow customers to control the flow of messages and modify them before they are sent/received, the event service 206 may be configured to pause delivery of messages to wait on the responses from other components, such as the app service 210. If an application code set is very slow, and the user receives many emails, a naïve implementation could lead service threads waiting for results from the app service 210 for a single customer. The systems 200 may address this problem handing application code set execution asynchronously.

The event service 206 may be configured to enable asynchronous execution of application code sets. The event service 206 may store state information associated with execution of application code sets. To be able to resume paused executions, the event service 206 may support an asynchronous callback mechanism to receive results. The event service 206 may store a state of an email message based on determining an event. For example, if an email message is processed to determine an event (e.g., receiving the email or sending the email), the event service 206 may store the state of the in-flight message in a state database 212. The event service 206 may send a request to the rules engine 204 to evaluate the email message and associated event. The rules engine 204 may determine the next action based on the event, the message, and rules associated relevant to the email message. Once the rules have been evaluated, the rules engine 204 may send the results back to the event service 206. The results may be sent to the event service 206 by adding the result to a queue monitored by the event service 206.

The request sent to the rules engine 204 may comprise data associated with the email message, the event, and/or the like. The data in the request may comprise an identifier associated with the email. The identifier may allow for accessing the email message stored in the email storage service 208. The data in the request may comprise a summary of the email message. The data in the request may comprise an event identifier (e.g., indicating a type of event).

The data in the request may comprise an answer field indicating a resource for providing the answer to the request. The answer field may indicate the queue monitored by the event service 206.

The result received from the rules engine 204 may comprise a variety of answers. The answers may indicate a command for processing the email message. For messages associated with a received email event (e.g., inbound email pipeline), the result may indicate that message should be bounced, dropped, continued (e.g., with optional message modification), sent to spam, not sent to spam, and/or the like. For messages associated with an outbound send event (e.g., outbound pipeline) the result may indicate that the message should be bounced, dropped, continued (e.g., with optional modification), smtp-routed, and/or the like.

As previously mentioned, the system 200 may comprise a rules engine 204. The rules engine 204 may be configured as an authority for processing rules related to events. The rules engine 204 may manage storage of rules, matching of events against rules, causing execution of application code sets, processing results of execution of application code sets, and/or the like. The rules engine 204 may provide an API for managing rules. The rules engine 204 may evaluate whether an event matches any rules. The rules may comprise conditions to evaluate if an action occurs. The rules may comprise actions to evaluate upon the result of evaluating a condition. An action may comprise causing execution of an application code set via the app service 210.

The rules engine 204 may check a rules database 214 to see if the event data matches any rules. Multiple rules may match an event. All matching rules may be executed (e.g., in an order specified at rule creation time, if any). The rules engine 204 may be configured to end processing of rules if one of rules results in an action that returns a "terminal" answer (e.g. Bounce or Drop). In this scenario, the rules engine 204 may be configured to not run any further actions for that message and/or event.

The rules engine 204 may be configured to allow asynchronous execution of application code sets. Since application code sets may take a long time to execute, the rules engine 204 may not wait for the results of application code set synchronously. The rules engine 204 may store a state of the in-progress evaluation in an evaluation database 216. The rules engine 204 may cause execution of an application code set by providing a request to an app manager 218. The app manager 218 may provide an asynchronous API to begin the execution of application code sets. The app manager 218 may manage storage, such as a queue 220 where responses from the app service 210 may be placed. The rules engine 204 may have at least one queue per event type (e.g., to avoid creating a single point of failure across components of the system).

The rules engine 204 may evaluate requests from the event service 206 using at least the following example logic:
As a request is received to evaluate a message:
1) Find rules that match the specified event data
2) If any rule is found that evokes an application code set:
a) Add a record to pending evaluations database
b) Call app manager for the first matching rule passing event data
3) Return void answer immediately
As each result is received from execution of an application code set:
1) Find corresponding request id in database
2) Mark the corresponding application code set as done and store its result
3) Find next pending application code set to invoke in matched rules
4) If any pending application code set:
Call app manager for next pending application code set
5) Else:
Send message to event service with answers from execution of application code set As mentioned above, the system 200 may comprise an app manager 218. The app manager 218 may be configured to cause the app service 210 to run one or more application code sets. The app manager 218 may provide a layer of logic for handling error conditions associated with execution of application code sets. The app manager 218 may be configured to manage failure modes (e.g., slow, failing application code sets), resource exhaustion, and/or the like. The app manager 218 may be called by the rules engine 204, if the rules engine 204 determines that an application code set should be executed in response to an event.

The app manager 218 may be configured to wait for answers from the app service 210. The app manager 218 may be configured to retry failures associated with execution of an application code set. The app manager 218 may handle thread exhaustion complexities and integration with app service 210. The app manager 218 may be configured to call application code sets in a synchronous fashion (e.g., rather than requiring that customers make a callback to an API with the results of an application code set).

The app manager 218 may be configured to provide a return value or exception in response to a request (e.g., from the rules engine 204). The app manager 218 may send to rules engine 204 a message indicating any errors. The app manager 218 may be configured to allow customers to control message flow (e.g., since customers can specify rules that return the appropriate value in the application code set).

The app manager 218 may be configured to limit concurrency used by a customer (e.g., to avoid thread exhaustion). Only a bounded number of threads per-box may be blocked by a single customer at any time. When this concurrency limit is reached, the app manager 218 may be configured to throttle calls and return the calls to the input queue for retry later. For example, there may be a limit of about 100 threads per box per customer. This can be achieved using a simple process-wide parameter (e.g., a semaphore used to control access to a common resource).

The app manager 218 may be configured to implement a retry policy. For retry policy, exponential backoff may be used (e.g., peaking at 15 mins). Retries can be performed for as long as the customer requested during rule creation (e.g., with a maximum retry time of 4 hours). If an application code set is still failing beyond the length of the retry period, the app manager 218 may return an error to the rule engine 204, which will in turn take the default action as configured by the customer.

The app manager 218 may be configured to implement event type application code sets. Event type code sets may be put in a queue and executed later (e.g., possibly multiple times). The caller may not get a response at all, and may not be informed of failures. Event type application code sets may be used in cases where the application code set is not intended to modify the message or affect its flow. For example, an event type application code set may comprise application code sets which gather metrics, or which add information to a ticket tracking system. Event type application code sets may have the option of making the call path synchronous. The app manager 218 and/or the rule engine 204 could return a response immediately to their callers, rather than responding via a queue or callback.

As previously mentioned, the system 200 may comprise the app service 210. The app service 210 may be configured to store a plurality of application code sets. The plurality of application code sets may be user defined. For example, different users may define and store different application code sets. The app service 210 may allow users to implement server side code without having to host or manage any servers typically required to execute the code.

An application code set may comprise a computer readable code under control of a customer to implement some piece of business logic related to email. The app service 210 may execute calls to the application code sets. The app service 210 may also access the email storage service 208 to access and/or modify an email message stored therein. For example, the app service may retrieve additional information about a message that is being processed.

The app service 210 may be configured to pass one or more parameters to an application code set (e.g., input parameters). The app service 210 may also receive results from the application code set. Depending on the type of event and/or the application code set, different information may be passed as parameters to the application code sets and different return types may be expected. For example, email inbound/outbound events may pass message identifiers, but control plane events may pass user identifiers, organization identifiers, and/or the like.

The one or more parameters may comprise a storage identifier for accessing data associated with the message in the email storage service 208. The storage identifier may be generated by the email storage service 208 and passed to the event service 206 (e.g., when the event service requests a message to be stored). The one or more parameters may comprise a message summary, meta data, and/or other information. The storage identifier may be used to access and/or modify an email message. An application code set (e.g., or app service 210) may access an API (e.g., or database) of the email storage service 2018 that allows for accessing and/or modifying the email message.

The message summary may comprise one or more message properties. The message summary may be provided as a convenience so that the customer does not have to retrieve and parse each e-mail message. The message summary may comprise an envelope addresses, content addresses, subject line, sent/received dates, whether the email contains attachments, and/or the like.

The app service 210 may return one or more results in response to execution (e.g., or attempted execution) of an application code script. An example result may comprise an action to apply to the email message, such as bounce, drop, continue, or SMTP route. Bounce may stop the sending/delivery and respond to sender that the message cannot be sent/delivered. Drop may silently stop the sending/delivery. Continue may continue the sending/delivery with the modified message and envelope stored in the email storage service 208. SMTP may be the same as continue, but routes to a SMTP gateway. The response may comprise a structured object which can store additional parameters (e.g., an address of the SMTP gateway).

As previously mentioned, the system 200 may comprise the email storage service 208. The email storage service 208 may comprise an API for accessing messages, such as in-transit messages (e.g., pending sending or receiving the message). The email storage service 208 may be called by the event service 206 (e.g., or an event publisher of the event service 206) to store messages. The email storage service 208 may be called by application code sets to retrieve and update messages.

Some application code sets will be able to fulfill their function simply by looking at the message summary passed directly to the application code set, while other application code sets may require access to other parts of the message, such as full body or attachments.

The email storage service 208 may be configured for storing complete messages in-transit (e.g., pending send or receive to a mailbox) and providing secure ways of accessing and updating them. In some scenarios, email storage service 208 may not store email storage service 208 email messages at rest (e.g., no pending send or receive to a mailbox). Messages that have already reached a mailbox may be accessed via typical protocols, such as EWS or IMAP. Monitoring changes on those messages can be done via existing features, such as push notifications.

In some implementations, email messages may be stored as raw MIME data. The messages may be accessed via an API (e.g., a CRUD API). There may be specialized API functions for use cases, such as removing an attachment, changing a recipient, add a header, The email storage service 208 may implement access controls. Users (e.g., email users, admins) may set policies on roles and users that control access to resources associated with email messages and/or email message accounts. In this way, users may have full control over which actors are able to take which actions on their data. For example, users can allow an application data set to read message data for in-transit messages but prevent them from modifying this data.

FIG. 3 is an example rule for processing an event associated with an email message. An example system may be configured to recognized one or more user roles, such as admin, developer, and email user. An admin may be granted permission to manage the rules described herein. In some scenarios, other users, such as developers or email subscribes may also have permission to manage rules. A user may provider user input (e.g., via a web interface, application interface, or an API) to create rules associated with an application, such as an email service. The rule may define actions to be performed in response to an event.

As an example, a user with an admin role may want all incoming email to be stripped of attachments if the email comes from a sender in the gmail.com domain. To do this, the user would create a rule like the one shown in FIG. 3. An example rule may comprise an event type field (e.g., "EventType"). The event type field may specify what event triggers an action and/or triggers evaluation of a condition associated with executing the action. An example event type may comprise receipt of an email (e.g. "MailReceived"), sending of an email (e.g., "MailSent"), delivery of an email message to an inbox, and/or the like.

The rule may comprise an action field (e.g., "Action"). The action field may specify an action to perform. The action to perform may comprise execution of an application code set. The action field may comprise a resource name (e.g., "ARN") used to identify and/or access an application code set.

The rule may comprise a condition field. The condition field may comprise a condition that must be met in order to execute the given action. An example condition may comprise a condition that a sender at least partially matches a string (e.g., "SenderMatches"), a condition that a recipient at least partially equals a string (e.g., RecipientEqual), and/or the like.

The rule may comprise a failure parameter, such as a retry period (e.g., "RetryPeriod"). The rule may comprise a default behavior parameter (e.g., "DefaultBehavior"). In the example shown in FIG. 3, if execution of an application code set fails, the system may continue to retry for up to one hour. If after one hour the application code set is still failing, the default action of "bounce" may be performed. For a security-related example like this, the user may define default behaviors in case execution is terminated or prevented due to security and/or privacy controls.

FIG. 4 is an example application code set in accordance with the present disclosure. Users, such as developers, may be allowed to add application code sets to a service platform. The application code set may perform some piece of discrete business logic related to an application, such as an email application.

If a rule engine determines to cause the application code set to execute, data may be provided to the application code set. An example parameter may comprise a message identifier, a message summary, one or more fields of an email message and/or the like. A message identifier may comprise a unique identifier which may be used to access and update the full message via an API. A message summary may be a condensed set of metadata about the message. The message summary may be used for basic analysis or to determine if the full message needs to be retrieved by the application code set.

The application code set may be configured to cause result of the execution to be returned. The result may comprise one of several pre-defined response types. The result may indicate the next action for processing a message. Example response types may comprise bounce (e.g., return message to sender), continue (e.g., message proceeds with subsequent processing), drop (e.g., message is dropped without notifying sender or recipient), or other routing (e.g., SMTP routing).

Continuing the example of removing attachments, FIG. 4 shows a sample application code set written in python that a user might write to remove attachments from a message. On lines 5-6, the message identifier and message summary are retrieved from data passed to the application code set. On line 7, the summary is used to check if there is an attachment on the message (e.g., without having to call out to another service). If there is no attachment, the application code set returns a "Continue" answer (e.g., indicating to continue processing of the message, such as delivery to a user email inbox). On line 8, the full message is retrieved using an API (e.g., workmail API) for accessing the message. On lines 10-12, a built-in Python MIME parsing library is used to parse the raw message into a usable format. A dedicated function (not shown here) is then called to iterate through the message parts and remove any that are of type attachment. On line 14 the application code set calls back to the API to save the modified message. On line 16, a result is returned to continue sending the message (e.g., which will use the modified message in subsequent processing). The rule engine may receive the result. A user, such as a customer of an email service may then receive the modified message. Additional mailbox rules defined by the user may be applied to the modified message.

Figure 5:
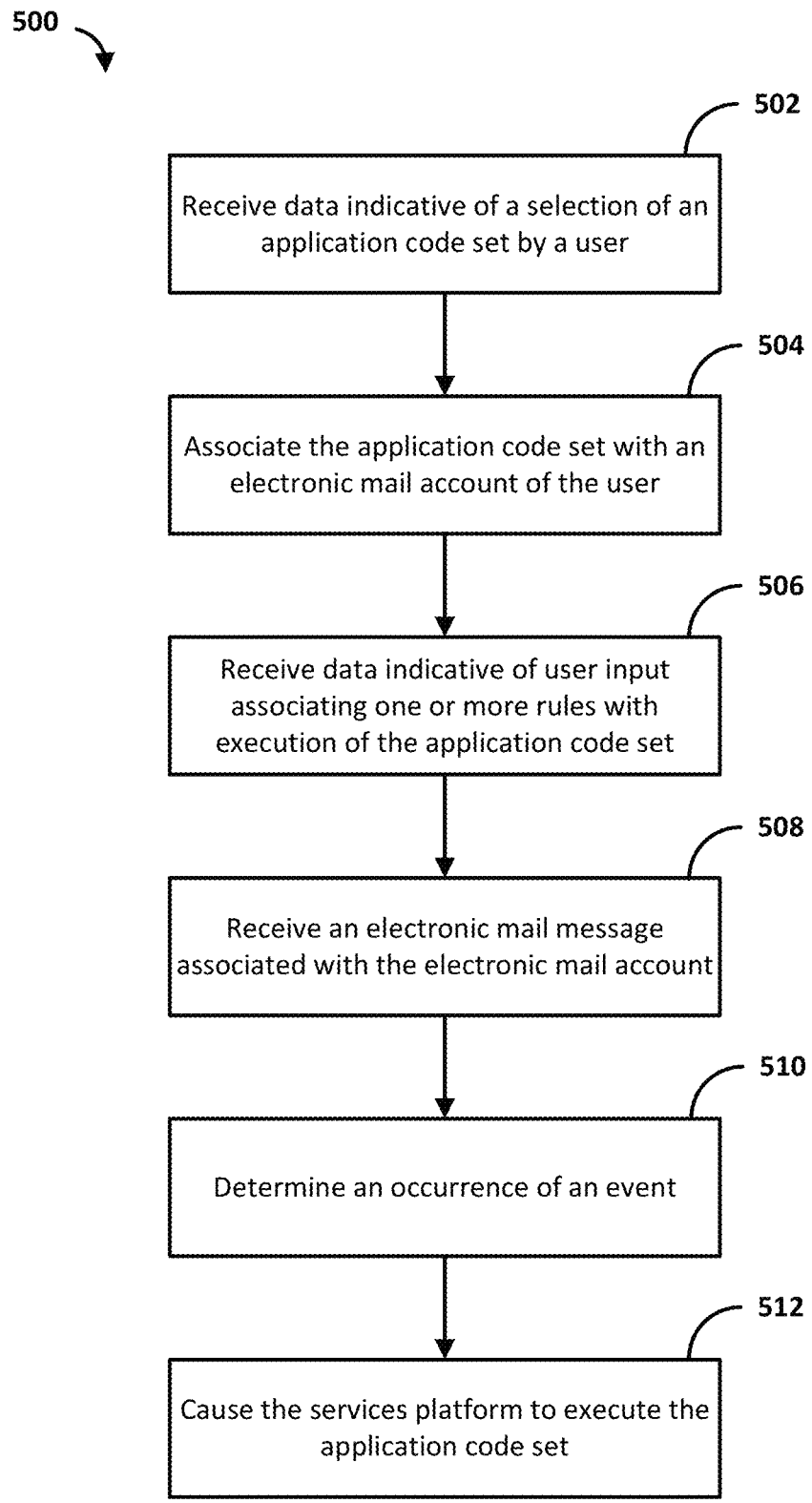
FIG. 5 is a flowchart illustrating an example method 500 for processing communications.

FIG. 5 is a flowchart illustrating an example method 500 for processing communications. The method 500 may comprise a computer implemented method for applying functionality to an email associated with an electronic mail application. A system, such as the system 100 of FIG. 1 may be configured to perform the method 500.

Operation 502 depicts receiving data indicative of a selection of an application code set by a user. The user may comprise an administrator having privileges to manage a plurality of electronic mail accounts (e.g., accounts for an organization). The user may comprise a subscriber associated with an electronic mail account. The data indicative of the selection of the application code set by the user may be received via a user interface representing a plurality of application code sets stored by a services platform. The services platform may be configured to allow a plurality of users to input the plurality of application code sets to the services platform for one or more of storing or sharing the application code sets. The application code set may be input to the services platform by the user. The services platform may comprise a web-based platform. The services platform may allow for execution of the application code set without the user managing a server configured to interpret and execute the application code set.

Operation 504 depicts associating the application code set with an electronic mail account (e.g., an email account of the user, or an email account of another user). The application code set may be associated with the electronic mail account based on the data indicative of the selection. Operation 506 depicts receiving data indicative of user input associating one or more rules with execution of the application code set. The one or more rules may associate an event with execution of the application code set. The one or more rules may comprise a condition to evaluate in response to occurrence of the event. A result of evaluation of the condition may trigger the causing of the services platform to execute the application code set. In some implementations, one or more of operation 502, 504, or 506 may be performed as one process, step, operation, and/or the like. The one or more rules may allow the user to associate the event and/or application code set with a specified set of users (e.g., users in a team, users of an organization, users associated with a location, users associated with a domain, etc.). Operation 504 may be performed automatically based on a determination of one or more electronic mail accounts associated with the user.

Operation 508 depicts receiving an electronic mail message associated with the electronic mail account. Operation 510 depicts determining an occurrence of the event. The occurrence of the event may be determined by an event service configured to detect events of the electronic mail application. The occurrence of the event may be associated with the electronic mail message. The event may comprise detecting the receiving of the electronic mail message. The occurrence of the event may be associated with the electronic mail account. The event may comprise detecting any condition associated with the electronic mail account.

Operation 512 depicts causing the services platform to execute the application code set. The services platform may be caused to execute the application by a rules engine. The services platform may be caused to execute the application based on the rules engine processing the one or more rules using data indicative of the occurrence of the event. Execution of the application code set may cause a service external to the services platform to generate content based on an electronic mail message. The application code set may be associated with the service external to the services platform. The application code set may cause sending of a request to an application programming interface associated with the service external to the services platform. A result of execution of the application code set may be received. The services platform may be caused to execute, based on the result, an additional application code set.

Figure 6:
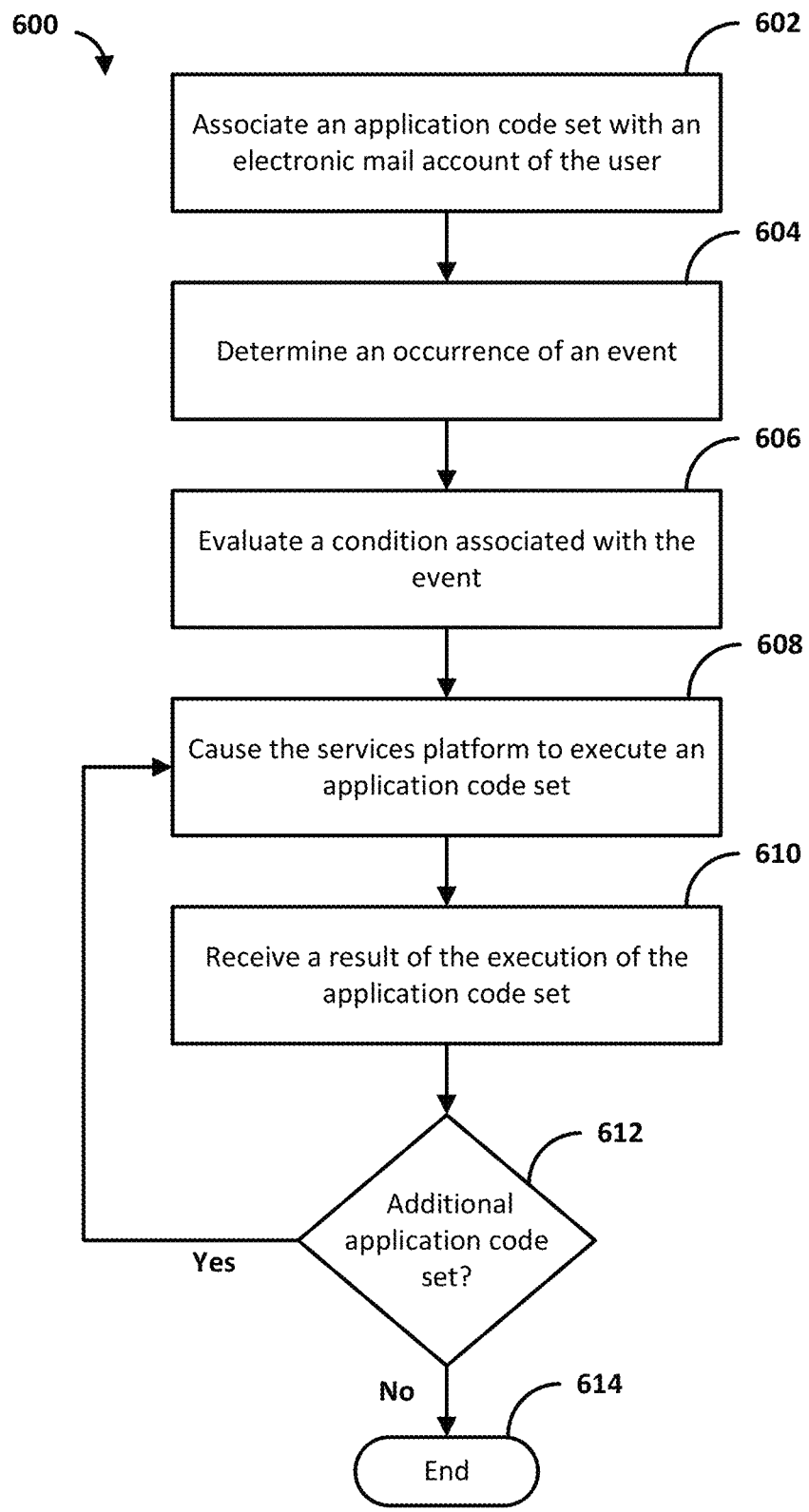
FIG. 6 is a flowchart illustrating an example method 400 for processing communications.

FIG. 6 is a flowchart illustrating an example method 400 for processing communications. The method 600 may comprise a computer implemented method for providing a function as a service to an electronic mail application. A system, such as the system 100 of FIG. 1 may be configured to perform the method 600.

Operation 602 depicts associating an application code set with an electronic mail account of the user. The application code set may be associated with the electronic mail account of the user based on data indicative of input by a user. The application code set may be stored by a services platform for accessing user defined application code sets. The application code set may be input to the services platform by the user. The services platform may comprise a web-based platform. The services platform may allow for execution of the application code set without the user managing a server configured to interpret and execute the application code set.

Operation 604 depicts determining an occurrence of an event. As an example, an electronic mail message associated with the electronic mail domain may be received or associated with a particular account associated with the domain. The electronic mail message may be received from an electronic mail server or service. The occurrence of the event may be determined based on the electronic mail message. The event may comprise detecting the receipt of the electronic mail message. The event may be also be associated with the electronic mail account. The event may comprise detecting any condition associated with the electronic mail domain or account. The event may comprise one or more of receiving the electronic mail message, a user accessing the electronic mail message, or the user indicating an action to perform on the electronic mail message.

Operation 606 depicts evaluating a condition associated with the event. The condition may be evaluated based on determining the occurrence of the event. The condition associated with the event may be evaluated by processing one or more rules associated with the electronic mail account. The one or more rules may indicate that the condition is to be evaluated in response to occurrence of the event. The condition may comprise a logical condition, such as comparison of (e.g., matching) data associated with the event (e.g., data in an email message) to a criterion specified by the user (e.g., presence of a particular characters in the data)

Operation 608 depicts causing the services platform to execute an application code set. The services platform may be configured to execute the application code set based on a result of evaluating the condition. The services platform may be configured to execute the application code set based on a result of evaluating another application code set. Execution of the application code set may modify the electronic mail message and/or some aspect of the email domain, for example, causing a change associated with an electronic mail account. The application code set may be configured to access data associated with the electronic mail message by accessing one or more of input parameter provided to the application code set or an application programming interface for accessing and modifying electronic mail. Execution of the application code may cause a service external to the services platform to generate content based on the electronic mail message, the email domain, an electronic mail account, and so on. Data associated with any or all of the email domain, an electronic mail account, and/or electronic mail message may be sent as input to the application code set.

Operation 610 depicts receiving a result of execution of the application code set. The result may be received from the services platform. The result may comprise a command associated with the email domain and/or an electronic mail account. The command may be associated with updating of the email domain, an electronic mail account, and/or the electronic mail message. The command may comprise allowing processing of an electronic mail message to continue, terminating processing of an electronic mail message, forwarding an electronic mail message (e.g., to a folder, to an electronic mail server, to another mail subscriber), and/or the like.

Operation 612 depicts determining whether to a cause execution of an additional application code set. The services platform may be caused to execute, based on the result, an additional application code set. The one or more rules may associate the event with both the application code set and the additional application code set. The one or more rules may specify execution of a plurality of application code sets, such as the application code set and the additional code set. The one or more rules may specify additional conditions to evaluate to determine whether to execute an additional application code set. The one or more rules may specify an order of execution of the plurality of application code sets. The one or more rules may indicate execution of the application code set before execution of the additional application code set. The one or more rules may specify that the result of execution of the application code set is an input (e.g., input parameter) of the additional application code set. If the result of operation 612 is yes, operation 608 may be performed with the additional application code set. If the result of operation 612 is no, processing of the event detected in operation 604 may be completed at operation 614.

Figure 7:
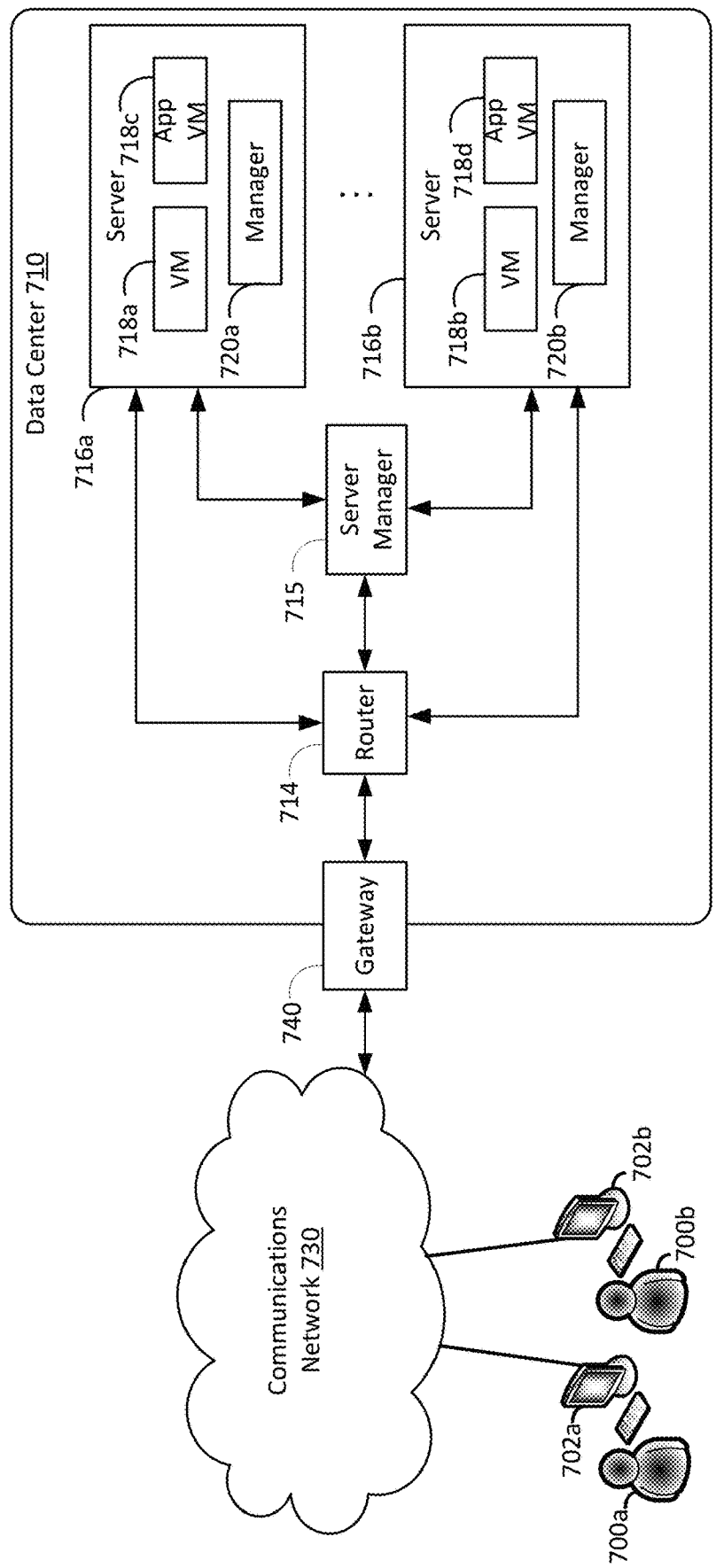
FIG. 7 is a diagram illustrating an example computing system that may be used in some embodiments.

As set forth above, a content provider may provide content to a destination over a network such as the Internet. Content may, in some cases, be provided upon request to a destination using, for example, streaming content delivery techniques. An example computing environment that enables providing of information to a destination will now be described in detail. In particular, FIG. 7 illustrates an example computing environment in which the embodiments described herein may be implemented. FIG. 7 is a diagram schematically illustrating an example of a data center 710 that can provide computing resources to users 700a and 700b (which may be referred herein singularly as user 700 or in the plural as users 700) via user computers 702a and 702b (which may be referred herein singularly as computer 702 or in the plural as computers 702) via a communications network 730. Data center 710 may be configured to provide computing resources for executing applications on a permanent or an as-needed basis. The computing resources provided by data center 710 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 710 may include servers 716a-b (which may be referred herein singularly as server 716 or in the plural as servers 716) that provide computing resources. These resources may be available as bare metal resources, or as virtual machine instances 718a-d and (which may be referred herein singularly as virtual machine instance 718 or in the plural as virtual machine instances 718). Virtual machine instances 718c and 718d are application server virtual machine instances. The application server virtual machine instances 218c and 218d may be configured to perform all or any portion of the application code set execution techniques in accordance with the present disclosure and described in detail below. As should be appreciated, while the particular example illustrated in FIG. 7 includes one application server virtual machine in each server, this is merely an example. A server may include more than one application server virtual machine or may not include any application server virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 7, communications network 730 may, for example, be a publicly accessible network of linked networks and possibly operated by various distinct parties, such as the Internet. In other embodiments, communications network 730 may be a private network, such as, a corporate or university network that is wholly or partially inaccessible to non-privileged users. In still other embodiments, communications network 730 may include one or more private networks with access to and/or from the Internet.

Communication network 730 may provide access to computers 702. User computers 702 may be computers utilized by users 700 or other customers of data center 710. For instance, user computer 702a or 702b may be a server, a desktop or laptop personal computer, a tablet computer, a wireless telephone, a personal digital assistant (PDA), an e-book reader, a game console, a set-top box or any other computing device capable of accessing data center 710. User computer 702a or 702b may connect directly to the Internet (e.g., via a cable modem or a Digital Subscriber Line (DSL)). Although only two user computers 702a and 702b are depicted, it should be appreciated that there may be multiple user computers.

User computers 702 may also be utilized to configure aspects of the computing resources provided by data center 710. In this regard, data center 710 might provide a gateway or web interface through which aspects of its operation may be configured through the use of a web browser application program executing on user computer 702. Alternately, a stand-alone application program executing on user computer 702 might access an application programming interface (API) exposed by data center 710 for performing the configuration operations. Other mechanisms for configuring the operation of various web services available at data center 710 might also be utilized.

Servers 716 shown in FIG. 7 may be standard servers configured appropriately for providing the computing resources described above and may provide computing resources for executing one or more web services and/or applications. In one embodiment, the computing resources may be virtual machine instances 718. In the example of virtual machine instances, each of the servers 716 may be configured to execute an instance manager 720a or 720b (which may be referred herein singularly as instance manager 720 or in the plural as instance managers 720) capable of executing the virtual machine instances 718. The instance managers 720 may be a virtual machine monitor (VMM) or another type of program configured to enable the execution of virtual machine instances 718 on server 716, for example. As discussed above, each of the virtual machine instances 718 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 710 shown in FIG. 7, a router 714 may be utilized to interconnect the servers 716a and 716b. Router 714 may also be connected to gateway 740, which is connected to communications network 730. Router 714 may be connected to one or more load balancers, and alone or in combination may manage communications within networks in data center 710, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details.

Additional computing systems and other devices may be interconnected in other embodiments and may be interconnected in different ways.

In the example data center 710 shown in FIG. 7, a server manager 715 is also employed to at least in part direct various communications to, from and/or between servers 716*a* and 716*b*. While FIG. 7 depicts router 714 positioned between gateway 740 and server manager 715, this is merely an exemplary configuration. In some cases, for example, server manager 715 may be positioned between gateway 740 and router 714. Server manager 715 may, in some cases, examine portions of incoming communications from user computers 702 to determine one or more appropriate servers 716 to receive and/or process the incoming communications. Server manager 715 may determine appropriate servers to receive and/or process the incoming communications based on factors such as an identity, location or other attributes associated with user computers 702, a nature of a task with which the communications are associated, a priority of a task with which the communications are associated, a duration of a task with which the communications are associated, a size and/or estimated resource usage of a task with which the communications are associated and many other factors. Server manager 715 may, for example, collect or otherwise have access to state information and other information associated with various tasks in order to, for example, assist in managing communications and other operations associated with such tasks.

It should be appreciated that the network topology illustrated in FIG. 7 has been greatly simplified and that many more networks and networking devices may be utilized to interconnect the various computing systems disclosed herein. These network topologies and devices should be apparent to those skilled in the art.

It should also be appreciated that data center 710 described in FIG. 7 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 8:
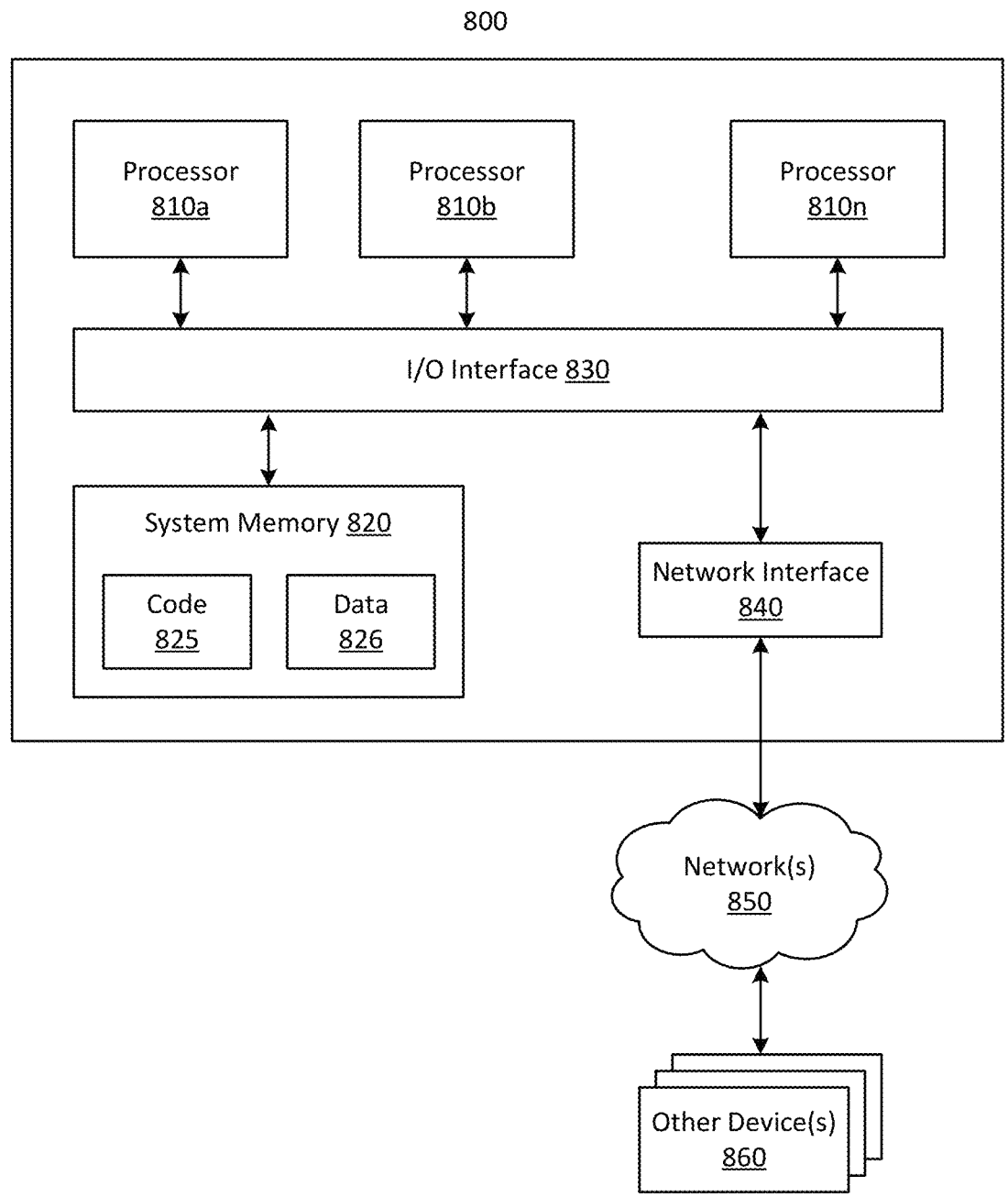
FIG. 8 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 8 depicts a general-purpose computer system that includes or is configured to access one or more computer-accessible media. In the illustrated embodiment, computing device 800 includes one or more processors 810*a*, 810*b* and/or 810*n* (which may be referred herein singularly as "a processor 810" or in the plural as "the processors 810") coupled to a system memory 820 via an input/output (I/O) interface 830. Computing device 8100 further includes a network interface 840 coupled to I/O interface 830.

In various embodiments, computing device 800 may be a uniprocessor system including one processor 810 or a multiprocessor system including several processors 810 (e.g., two, four, eight or another suitable number). Processors 810 may be any suitable processors capable of executing instructions. For example, in various embodiments, processors 810 may be general-purpose or embedded processors implementing any of a variety of instruction set architectures (ISAs), such as the x86, PowerPC, SPARC or MIPS ISAs or any other suitable ISA. In multiprocessor systems, each of processors 810 may commonly, but not necessarily, implement the same ISA.

System memory 820 may be configured to store instructions and data accessible by processor(s) 810. In various embodiments, system memory 820 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 820 as code 825 and data 826.

In one embodiment, I/O interface 830 may be configured to coordinate I/O traffic between processor 810, system memory 820 and any peripherals in the device, including network interface 840 or other peripheral interfaces. In some embodiments, I/O interface 830 may perform any necessary protocol, timing or other data transformations to convert data signals from one component (e.g., system memory 820) into a format suitable for use by another component (e.g., processor 810). In some embodiments, I/O interface 830 may include support for devices attached through various types of peripheral buses, such as a variant of the Peripheral Component Interconnect (PCI) bus standard or the Universal Serial Bus (USB) standard, for example. In some embodiments, the function of I/O interface 830 may be split into two or more separate components, such as a north bridge and a south bridge, for example. Also, in some embodiments some or all of the functionality of I/O interface 830, such as an interface to system memory 820, may be incorporated directly into processor 810.

Network interface 840 may be configured to allow data to be exchanged between computing device 800 and other device or devices 860 attached to a network or networks 850, such as other computer systems or devices, for example. In various embodiments, network interface 840 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 820 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 800 via I/O interface 80. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 800 as system memory 80 or another type of memory. Further, a computer-accessible medium may include transmission media or signals such as electrical, electromagnetic or digital signals conveyed via a communication medium such as a network and/or a wireless link, such as those that may be implemented via network interface 80. Portions or all of multiple computing devices such as those illustrated in FIG. 7 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java' virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method for extending functionality associated with an electronic mail application, the method comprising:

receiving, via a user interface representing a plurality of application code sets stored by a services platform, data indicative of a selection of an application code set by a user, wherein the services platform is configured to allow a plurality of users to input the plurality of application code sets to the services platform for one or more of storing or sharing the application code sets;

associating, based on the data indicative of the selection, the application code set with an electronic mail account;

receiving data indicative of user input associating one or more rules with execution of the application code set, wherein the one or more rules associate an event with execution of the application code set;

determining, by an event service configured to detect events of the electronic mail application, an occurrence of the event; and causing, based on a rules engine processing the one or more rules using data indicative of the occurrence of the event, the services platform to execute the application code set.

2. The method of claim 1, wherein the one or more rules comprise a condition to evaluate in response to occurrence of the event, and wherein a result of evaluation of the condition triggers the causing of the services platform to execute the application code set.

3. The method of claim 1, further comprising receiving a result of execution of the application code set and causing the services platform to execute, based on the result, an additional application code set.

4. The method of claim 1, wherein execution of the application code set causes a service external to the services platform to generate content based on an electronic mail message.

5. The method of claim 1, wherein the plurality of application code sets comprises one or more of computer executable instructions, a computer executable script, or an executable application.

6. A system for providing a function as a service to an electronic mail application, the system comprising one or more memories having instructions thereon that, upon execution, at least cause the system to:
associate, based on data indicative of input by a user, an application code set with an electronic mail account, wherein the application code set is stored by a services platform for accessing user defined application code sets;
determine, based on the electronic mail account, an occurrence of an event;
evaluate, based on determining the occurrence of the event, a condition associated with the event; and
cause, based on a result of evaluating the condition, the services platform to execute the application code set.

7. The system of claim 6, wherein the system is configured to evaluate the condition associated with the event by processing one or more rules associated with the electronic mail account, wherein the one or more rules indicate that the condition is to be evaluated in response to occurrence of the event.

8. The system of claim 6, wherein the application code set is input to the services platform by the user.

9. The system of claim 6, wherein the services platform comprises a web-based platform that allows for execution of the application code set without the user managing a server configured to interpret and execute the application code set.

10. The system of claim 6, wherein the event comprises one or more of receiving an electronic mail message, a user accessing an electronic mail message, or a user indicating an action to perform on an electronic mail message.

11. The system of claim 6, wherein the system is further configured to receive a result of execution of the application code set and cause the services platform to execute, based on the result, an additional application code set.

12. The system of claim 6, wherein execution of the application code set modifies one or more of an electronic mail message or the electronic mail account.

13. The system of claim 6, wherein execution of the application code set causes a service external to the services platform to generate content based on one or more of an electronic mail message or the electronic mail account.

14. The system of claim 6, wherein the application code set is configured to access data associated with the electronic mail account by accessing one or more of input parameter provided to the application code set or an application programming interface for accessing and modifying electronic mail data.

15. The system of claim 6, wherein the system is further configured to receive data indicative of user input associating one or more rules with execution of the application code set, wherein the one or more rules associate the event with execution of the application code set.

16. A non-transitory computer-readable storage medium having stored thereon computer-readable instructions, the computer-readable instructions comprising instructions that upon execution on one or more computing devices, at least cause:
associating, based on data indicative of input by a user, an application code set with an electronic mail account, wherein the application code set is stored by a services platform for accessing user defined application code sets;
determining, based on the electronic mail account, an occurrence of an event;
evaluating, based on determining the occurrence of the event, a condition associated with the event; and
causing, based on a result of evaluating the condition, the services platform to execute the application code set.

17. The computer-readable storage medium of claim 16, wherein the instructions further cause evaluating the condition associated with the event by processing one or more rules associated with the electronic mail account, wherein the one or more rules indicate that the condition is to be evaluated in response to occurrence of the event.

18. The computer-readable storage medium of claim 16, wherein the instructions, upon execution on one or more computing devices, further cause receiving a result of execution of the application code set and causing the services platform to execute, based on the result, an additional application code set.

19. The computer-readable storage medium of claim 16, wherein the services platform comprises a web-based platform that allows for execution of the application code set without the user managing a server configured to interpret and execute the application code set.

20. The computer-readable storage medium of claim 16, wherein the event comprises one or more of receiving an electronic mail message, a user accessing an electronic mail message, or a user indicating an action to perform on an electronic mail message.

21. The computer-readable storage medium of claim 16, wherein execution of the application code set one or more of causes one or more of modification to an electronic mail message, causes modification of the electronic mail account, or causes a service external to the services platform to generate content based on an electronic mail message.

* * * * *